(12) United States Patent
Kato et al.

(10) Patent No.: US 7,164,555 B2
(45) Date of Patent: Jan. 16, 2007

(54) MAGNETIC HEAD WITH HEATER OF THERMAL FLYING HEIGHT CONTROL

(75) Inventors: Atsushi Kato, Kanagawa (JP); Toshiya Shiramatsu, Ibaraki (JP); Masahiko Soga, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/201,902

(22) Filed: Aug. 10, 2005

(65) Prior Publication Data

US 2006/0034014 A1    Feb. 16, 2006

(30) Foreign Application Priority Data

Aug. 10, 2004    (JP) ............................. 2004-233251

(51) Int. Cl.
*G11B 5/10* (2006.01)
(52) U.S. Cl. ................. 360/128; 360/234.7; 360/294.7
(58) Field of Classification Search ................... None
See application file for complete search history.

(56) References Cited

U.S. PATENT DOCUMENTS

2003/0099054 A1    5/2003    Kamijima

FOREIGN PATENT DOCUMENTS

| JP | 05-020635 | 1/1993 |
|----|-----------|--------|
| JP | 2003-168274 | 6/2003 |

*Primary Examiner*—Hoa T. Nguyen
*Assistant Examiner*—Mitchell Slavitt
(74) *Attorney, Agent, or Firm*—Townsend and Townsend and Crew LLP; Rambod Nader

(57) ABSTRACT

In one embodiment, a magnetic write/read device comprising a magnetic read element and a magnetic write element is formed in a thin film magnetic head portion of a magnetic head slider. A heat generating resistor is formed between a substrate portion and the magnetic reproducing device for heating thereby thermally expanding and protruding a portion of the magnetic head slider to control the flying height. The heat generating resistor is positioned between the substrate portion and the magnetic reproducing device being apart from the magnetic reproducing device for making the response speed for the flying height control of the magnetic head slider as high as possible and decreasing the effect caused by the heat generation of the heat generating resistor on the magnetic reproducing device as little as possible. The thickness of the insulating film is made greater than 10 times or less that of the heat generating resistor for ensuring insulation between the heat generating resistor and the metal film of a lower shield film.

18 Claims, 8 Drawing Sheets

MAGNETIC HEAD WITH HEATER OF THERMAL FLYING HEIGHT CONTROL

CROSS-REFERENCES TO RELATED APPLICATIONS

This application claims priority from Japanese Patent Application No. JP2004-233251, filed Aug. 10, 2004, the entire disclosure of which is incorporated herein by reference.

BACKGROUND OF THE INVENTION

The present invention relates to a structure of a magnetic head slider for attaining high-density recording in a magnetic disk drive. In particular, the invention relates to a flying height controlling slider having a function of controlling the distance between a magnetic disk and a magnetic head.

A magnetic disk drive comprises a rotating magnetic disk and a slider having a magnetic read/write device constituting a magnetic head mounted thereon and supported by a suspension, in which the slider runs relatively on the magnetic disk to read and write magnetic information to the magnetic disk. The slider flies by the air edging film effect as an air lubrication bearing, so that the magnetic disk and the slider are not in direct solid contact with each other. To increase the recording density of the magnetic disk drive thereby increasing the capacity thereof or decreasing the size thereof, it is effective to decrease the distance between the slider and the magnetic disk, that is, the flying height of the slider thereby increasing the linear recording density.

Heretofore, the slider flying height has been designed to have a margin so that the slider does not come in contact with the disk even under the worst conditions while allowing for lowering of the flying height caused, for example, by fabrication variations, difference of the atmospheric pressure in the working circumstance, and the temperature difference in the working circumstance. The margin can be saved if a slider having a function of controlling the flying height on every individual head or in accordance with the working circumstance can be provided, whereby the flying height of the magnetic read/write device can be decreased greatly while the slider is prevented from coming into contact with the disk.

Patent document 1 (Japanese Patent Laid-open No. 5(1993)-20635) discloses a technique of providing a thin film resistor between a lower magnetic pole piece and an upper magnetic pole piece of an induction type thin film magnetic head and optionally energizing the resistor to heat thereby thermally expanding and protruding the top end of the magnetic pole piece to decrease the gap between the top end of the magnetic pole piece and the magnetic disk surface. Patent document 2 (Japanese Patent Laid-open No. 2003-168274) discloses a technique of providing a heat generation means at the rear portion of a writing head device and a reading head device thereby controlling the magnetic spacing.

BRIEF SUMMARY OF THE INVENTION

For decreasing the flying height of the slider greatly, it is necessary to supply to a heat generating resistor a large current which is comparable with a current supplied to the coil of the magnetic recording device. Accordingly, if an insulating film has a thickness not large enough to ensure insulation between the heat generating resistor and a metal film such as a magnetic pole piece situated in the vicinity thereof is not large enough, there occurs a problem of causing electrical leakage between the heat generating resistor and the magnetic film such as the magnetic pole piece. This problem becomes conspicuous, particularly, as the size of the slider and the magnetic read/write device is decreased for higher recording density. Further, it is important to decrease the effect by the heat generation of the heat generating resistor on the magnetic read/write device and make the response speed for the flying height control of the slider as rapid as possible. In addition, for this purpose, it is necessary to devise the arrangement of the heat generating resistor.

It is a feature of the present invention to provide a magnetic head slider capable of preventing electrical leakage between a heat generating resistor and a metal film in the vicinity thereof.

It is another feature of the invention to provide a magnetic head slider capable of preventing electrical leakage between a heat generating resistor and a metal film in the vicinity thereof and improving the response speed for the flying height control without increasing the temperature of a magnetoresistive device.

It is still another feature of the invention to provide a magnetic disk drive capable of normal magnetic reading and writing even against the change of the temperature inside the drive and the circumstantial temperature such as atmospheric temperature.

In accordance with an aspect of the present invention, a magnetic head slider comprises a substrate portion; a first insulating film formed over the substrate portion; a heat generating resistor formed on the first insulating film; a second insulating film formed within and over the heat generating resistor; and a write/read device formed on the second insulating film; wherein a thickness of the second insulating film is greater than that of the heat generating resistor.

In some embodiments, the thickness of the second insulating film is 10 times or less that of the heat generating resistor. The heat generating resistor is a thin film resistor meandering over the first insulating film. The magnetic read/write device comprises a stack of a magnetic read element and a magnetic write element, and the second insulating film is disposed between the heat generating resistor and the magnetic read element. The top end of the heat generating resistor is formed at a position apart backward from the magnetic read element of the magnetic read/write device. The second insulating film comprises alumina and has a film thickness greater than and 10 times or less that of the heat generating resistor. The heat generating resistor is a fine wire of NiFe or NiCr meandering over the first insulation film.

In accordance with another aspect of the present invention, a magnetic head slider comprises a slider having a leading edge face and a trailing edge face; a first insulating film formed on the trailing edge face of the slider; a heat generating resistor formed on the first insulating film; a second insulating film formed within and over the heat generating resistor, and a magnetic read/write device formed on the second insulating film; wherein a thickness of the second insulating film is greater than that of the heat generating resistor.

In some embodiments, the thickness of the second insulating film is 10 times or less that of the heat generating resistor. The top end of the heat generating resistor is formed at a position far backward from the magnetic read element of the magnetic read/write device. The thickness of the second insulating film is 10 times or less that of the heat generating resistor.

In accordance with another aspect of the present invention, a magnetic disk drive comprises a magnetic disk; a spindle motor for rotating the magnetic disk supported on a rotary shaft thereof; a magnetic head slider for writing and reading information to and from the magnetic disk; a suspension for supporting the magnetic head slider; and a driving device for moving the suspension in a radial direction of the magnetic disk. The magnetic head slider comprises a substrate portion; a first insulating film formed over the substrate portion; a heat generating resistor formed on the first insulating film; a second insulating film formed within and over the heat generating resistor and having a thickness greater than that of the heat generating resistor; and a read/write device formed on the second insulating film.

In accordance with another aspect of the present invention, a magnetic disk drive comprises a magnetic disk; a spindle motor for rotating the magnetic disk supported on a rotary shaft thereof; a magnetic head slider for writing and reading information to and from the magnetic disk; a suspension for supporting the magnetic head slider; and a driving device for moving the suspension in a radial direction of the magnetic disk. The magnetic head slider comprises a substrate portion; a first insulating film formed over the substrate portion; a heat generating resistor formed on the first insulating film; a second insulating film formed within and over the heat generating resistor; and a read/write device formed on the second insulating film; wherein a top end of the heat generating resistor is formed at a position far backward from the magnetic reproducing device of the magnetic read/write device, and a thickness of the second insulating film is greater than that of the heat generating resistor.

According to the invention, electrical leakage between the heat generating resistor for flying height control and a metal film in the vicinity thereof can be prevented in a magnetic head slider having a function of flying height controlling. FIG. 1 is an enlarged cross-sectional partial view (cross-sectional view taken along line X—X in FIG. 4) of a magnetic head slider according to an embodiment of the present invention.

DETAILED DESCRIPTION OF THE INVENTION

A description will be made of a magnetic head slider and a magnetic disk drive using the slider in accordance with embodiments of the present invention with reference to the drawings.

Figure 2:
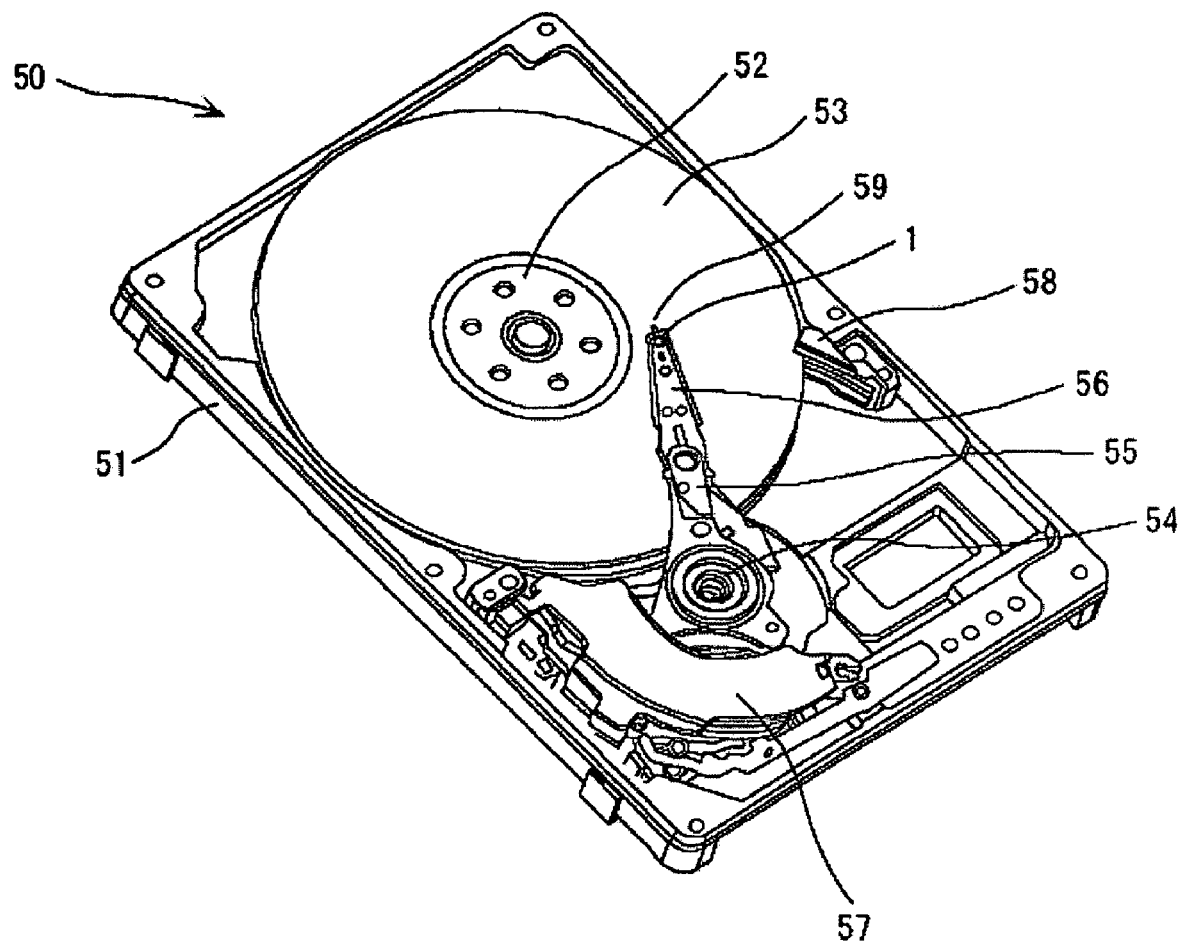
FIG. 2 is a perspective view showing the constitution of a magnetic disk drive mounting a magnetic head slider according to the embodiment of the invention.

FIG. 2 shows a constitution of a magnetic disk drive 50. A magnetic disk 53 is mounted to a rotary shaft 52 of a spindle motor fixed to a base 51 and is driven in rotation. An actuator arm 55 is journaled on a pivot 54 and a suspension 56 is attached to one end and a coil (not illustrated) constituting a driving device (voice coil motor) 57 is attached to the other end of the actuator arm 55. A magnetic head slider 1 is attached to the top end of the suspension 56. A ramp mechanism 58 is provided on the base 51 and situated on the outer periphery of the magnetic disk 53. The ramp mechanism 58 has a slope over which a lift tab 59 rides over upon unloading of the magnetic head slider 1.

When a current is supplied to the coil of the voice coil motor 57, rotary torque is generated in the actuator arm 55 and the suspension 56 attached to the actuator arm 55 is moved in the radial direction of the magnetic disk 53. By the rotating operation, the magnetic header slider 1 attached to the top end of the suspension 56 is displaced to an optional radial position of the magnetic disk 53 for reading and writing data. Upon unloading of the magnetic head slider 1, the lift tab 59 is moved so as to ride over the slope of the ramp mechanism 58, whereas it is loaded from the stand-by state at the ramp mechanism 58 to the recording surface of the magnetic disk 53 upon loading.

The magnetic head slider 1 flies due to the air wedging film effect as an air lubrication bearing such that the magnetic disk 53 and the magnetic head slider 1 do not come in direct solid contact with each other. The flying height of the magnetic head slider 1 is about 10 nm or less. While the drive having a load-unload mechanism is illustrated herein, a contact start stop type magnetic disk drive may be applicable in which the magnetic head slider 1 stands by in a specified region of the magnetic disk 53 during stopping of the drive. Further, the magnetic recording method may adopt either in-plane recording or vertical recording system.

Figure 3:
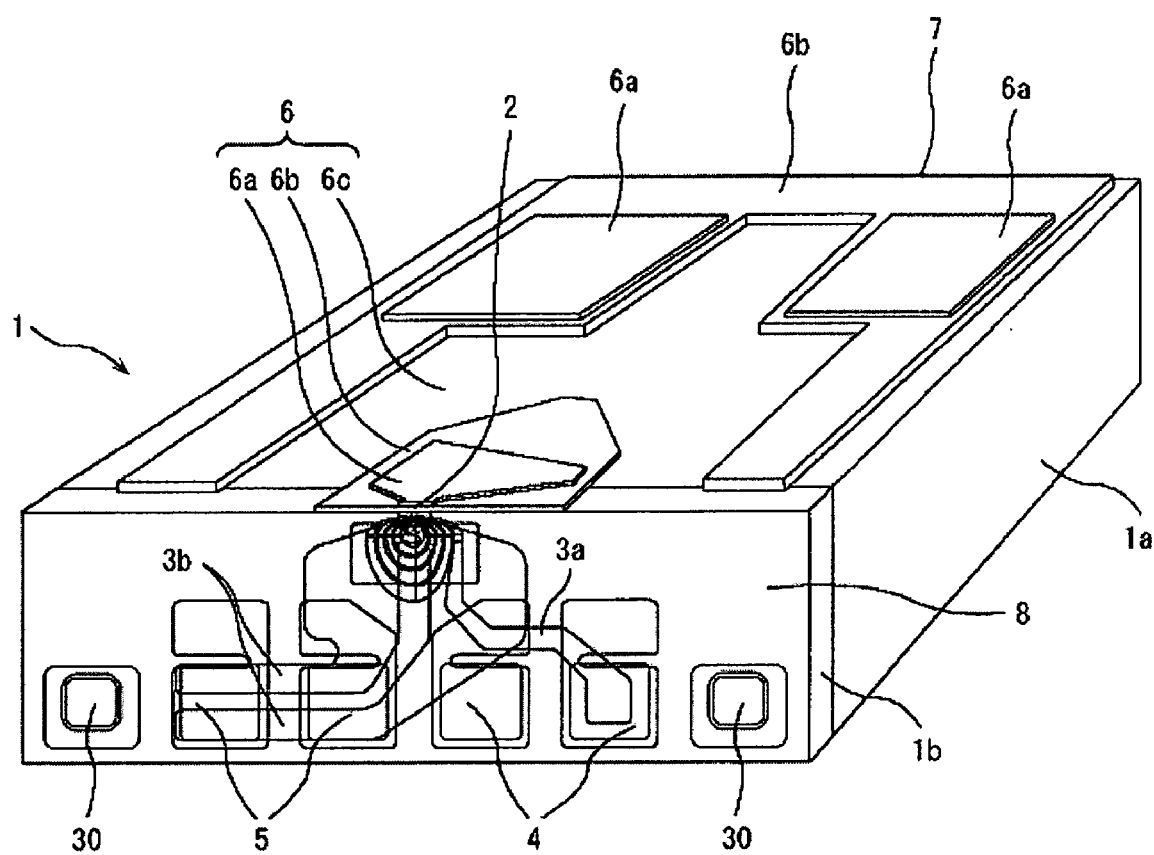
FIG. 3 is a perspective view showing the entire constitution of the magnetic head slider according to the embodiment of the invention.

FIG. 3 shows only the magnetic head slider 1 of FIG. 2 in an enlarged scale. The magnetic head slider 1 comprises a substrate portion (slider) 1a made of a material typically represented by alumina and titanium carbide sintered body (hereinafter simply referred to as ALTIC), and a thin film magnetic head portion 1b. The slider 1a is in a substantially rectangular shape of 1.25 mm in length, 1.0 mm in width and 0.3 mm in thickness and constituted with an air bearing surface 6, a leading edge face 7, a trailing edge face 8, lateral surfaces on both sides and a back surface, that is, six surfaces in total (Pico-slider). The size of the slider may also be 0.85 mm in length, 0.7 mm in width and 0.3 mm in thickness in order to improve the positioning accuracy due to decrease of mass, cost reduction, etc. (femto-slider). A stepped bearing constituted with fine steps is provided by ion milling, etching or like other process, and faces the magnetic disk to generate an air pressure, which functions as an air bearing for supporting a load applied on the back surface.

The air bearing surface 6 is formed with three kinds of steps substantially in parallel to each other: a rail surface 6a nearest to the disk, a shallow groove surface 6b as a stepped bearing surface deeper by about 100 nm to 200 nm from the rail surface 6a, and a deep groove surface 6c deeper by about 1 μm than the rail surface 6a. When an air stream generated by the rotation of the disk proceeds from the shallow groove surface 6b as the stepped bearing on the side of the leading edge face 7 to the rail surface 6a, it is compressed due to a tapered flow channel to create a positive air pressure. On the other hand, when an air stream proceeds from the rail surface 6a or the shallow groove surface 6b to the deep groove surface 6c, a negative air pressure is created due to expansion of the flow channel. In FIG. 3, the depth of the groove is exaggerated.

The magnetic head slider 1 is designed such that it flies in an attitude to make the flying height on the side of the leading edge face 7 greater than that on the side of the trailing edge face 8. Accordingly, the air bearing surface near the trailing edge face is closest to the disk. Near the trailing edge face 8, since the rail surface 6a protrudes relative to the peripheral shallow groove surface 6b and deep groove surface 6c, the rail surface 6a is nearest to the disk unless the attitude of the slider pitch and roll is declined exceeding a predetermined extent. A magnetic read/write device 2 is formed at a portion of the thin film head portion 1b on the rail surface 6a. The shape of the air bearing surface 6 is designed such that the load applied from the suspension and positive or negative air pressure generated at the air bearing surface 6 are well-balanced to keep a distance between the magnetic read/write device 2 and the disk to an appropriate value of about 10 nm. While the description has been made of the slider having the two-step air bearing surface in which the bearing surface 6 comprises the three kinds of surfaces 6a, 6b and 6c which are substantially in parallel with each other, a slider may have a stepped air bearing surface constituted with four or more kinds of parallel surfaces.

Figure 1:
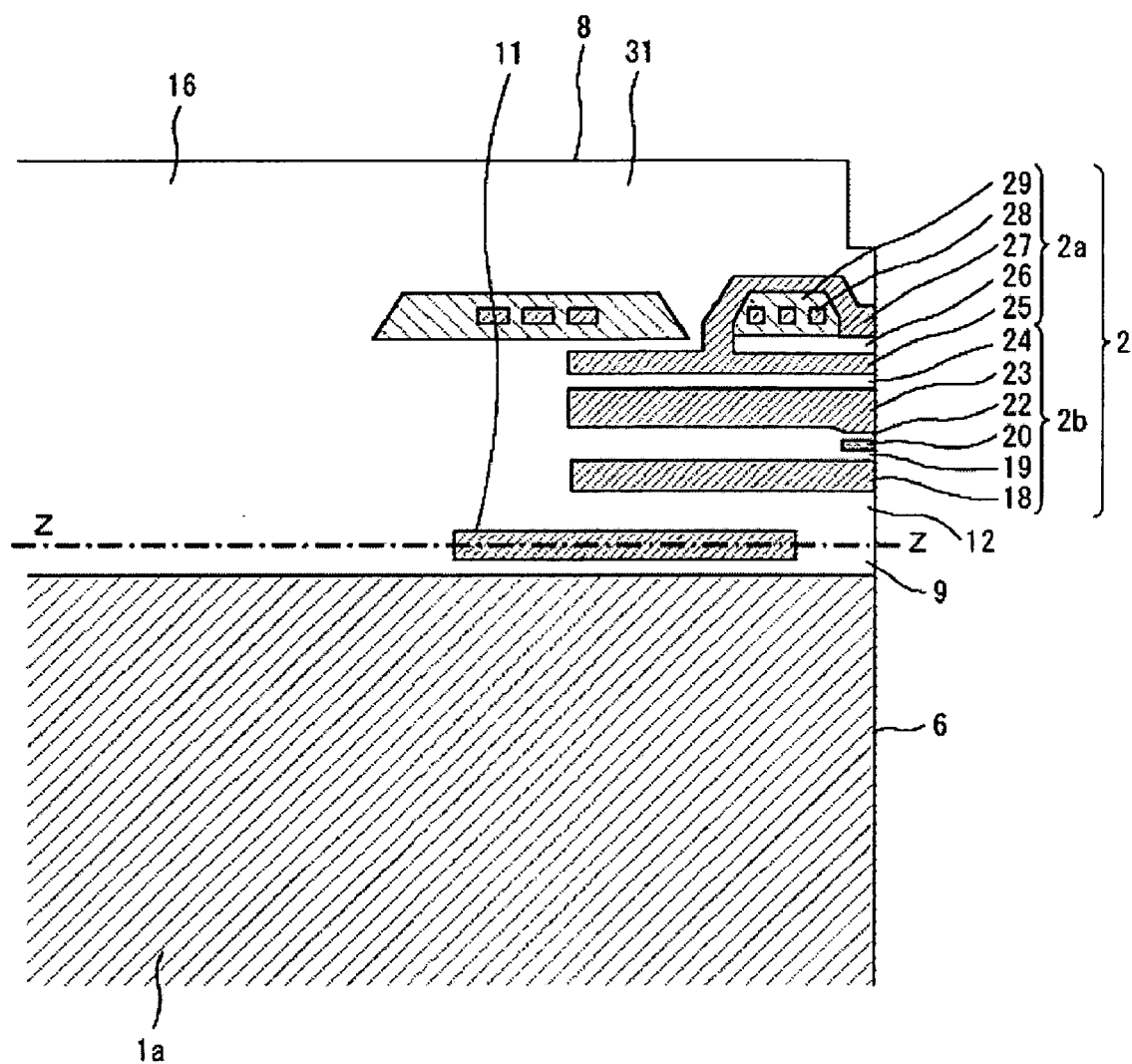
FIG. 1 is an enlarged cross-sectional partial view (cross-sectional view taken along line X—X in FIG. 4) of a magnetic head slider according to an embodiment of the present invention.
Figure 4:
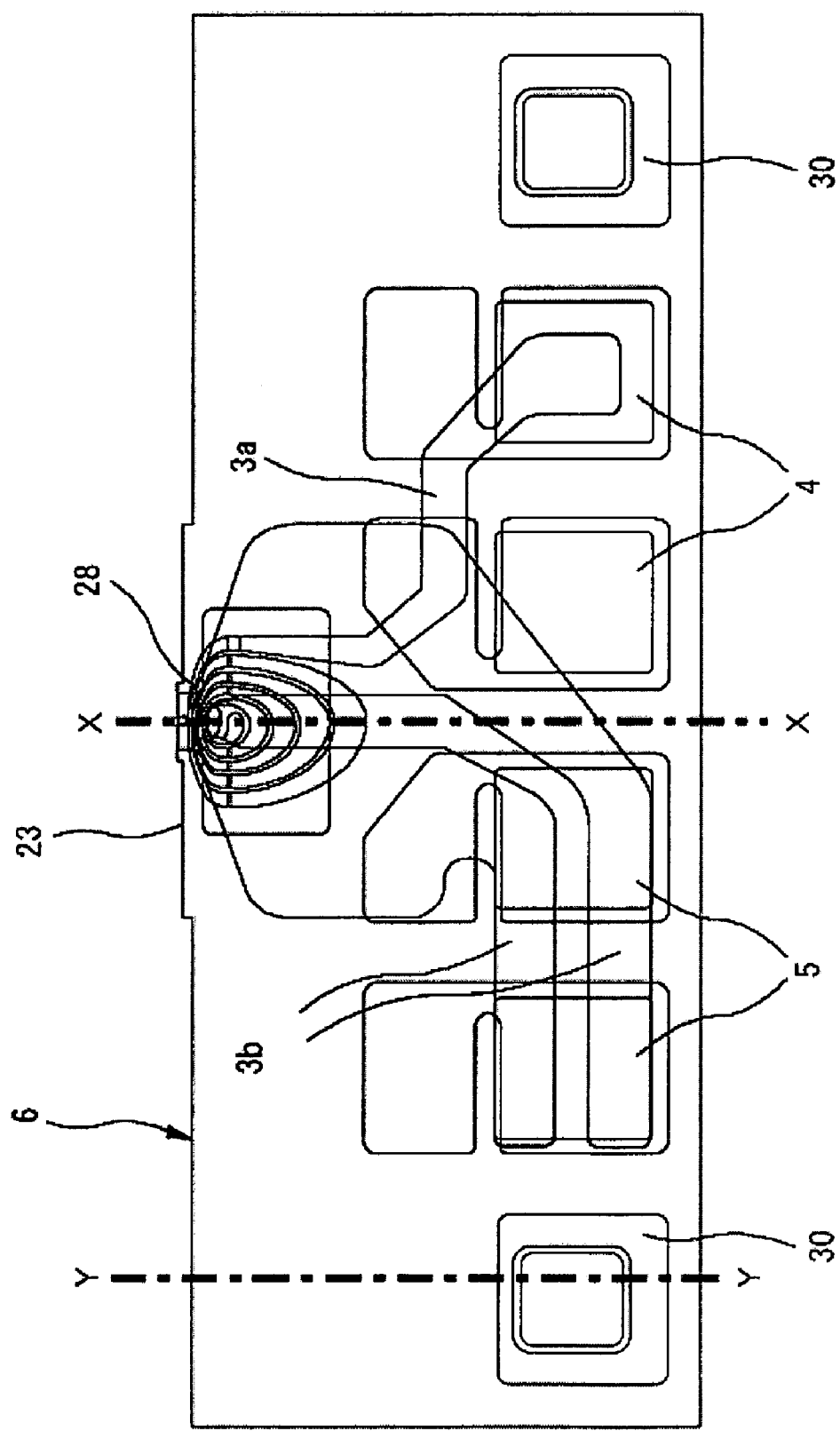
FIG. 4 is a view of the trailing edge face of the magnetic head slider shown in FIG. 3.
Figure 5:
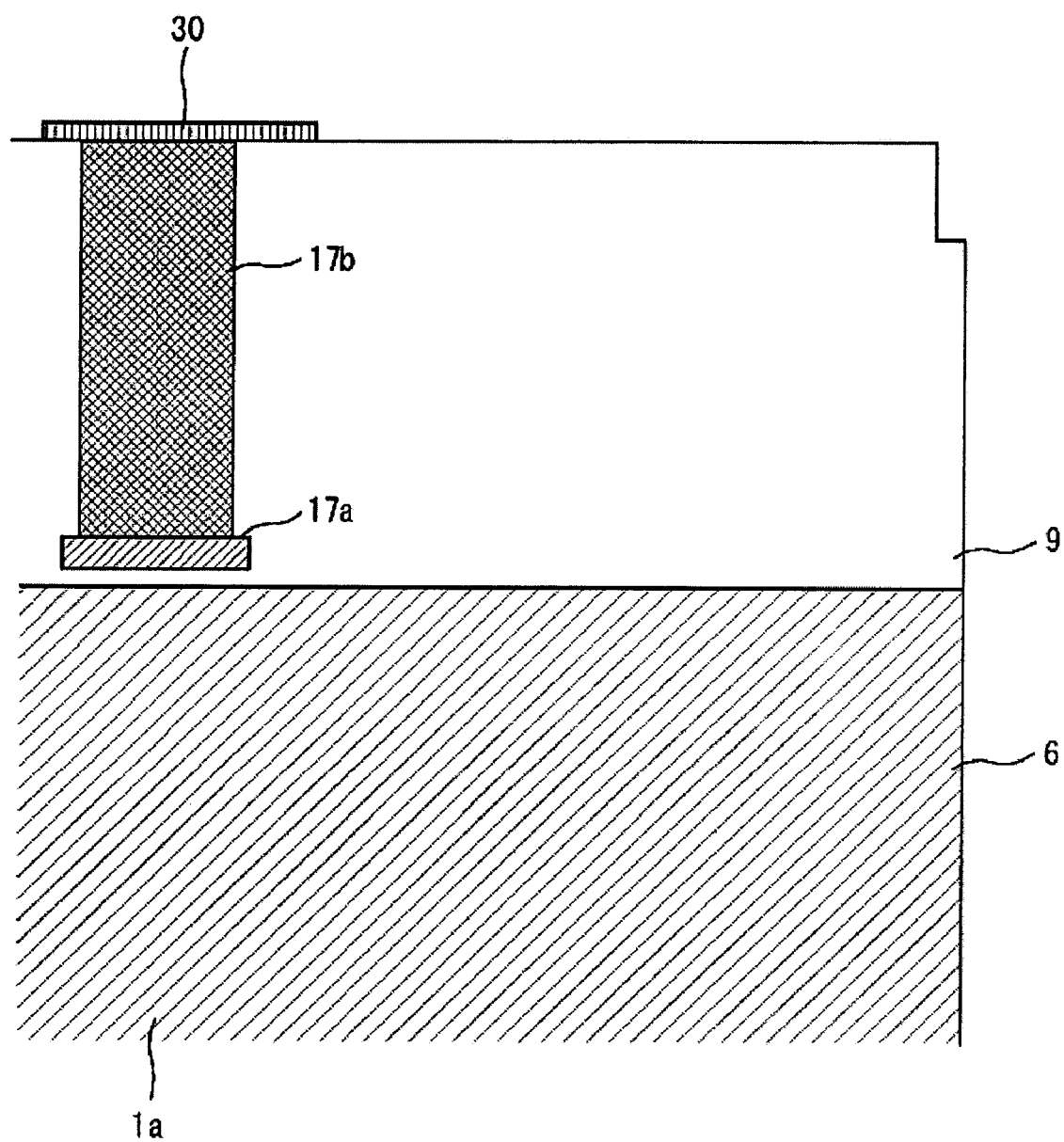
FIG. 5 is a cross-sectional view along line Y—Y in FIG. 4.
Figure 6:
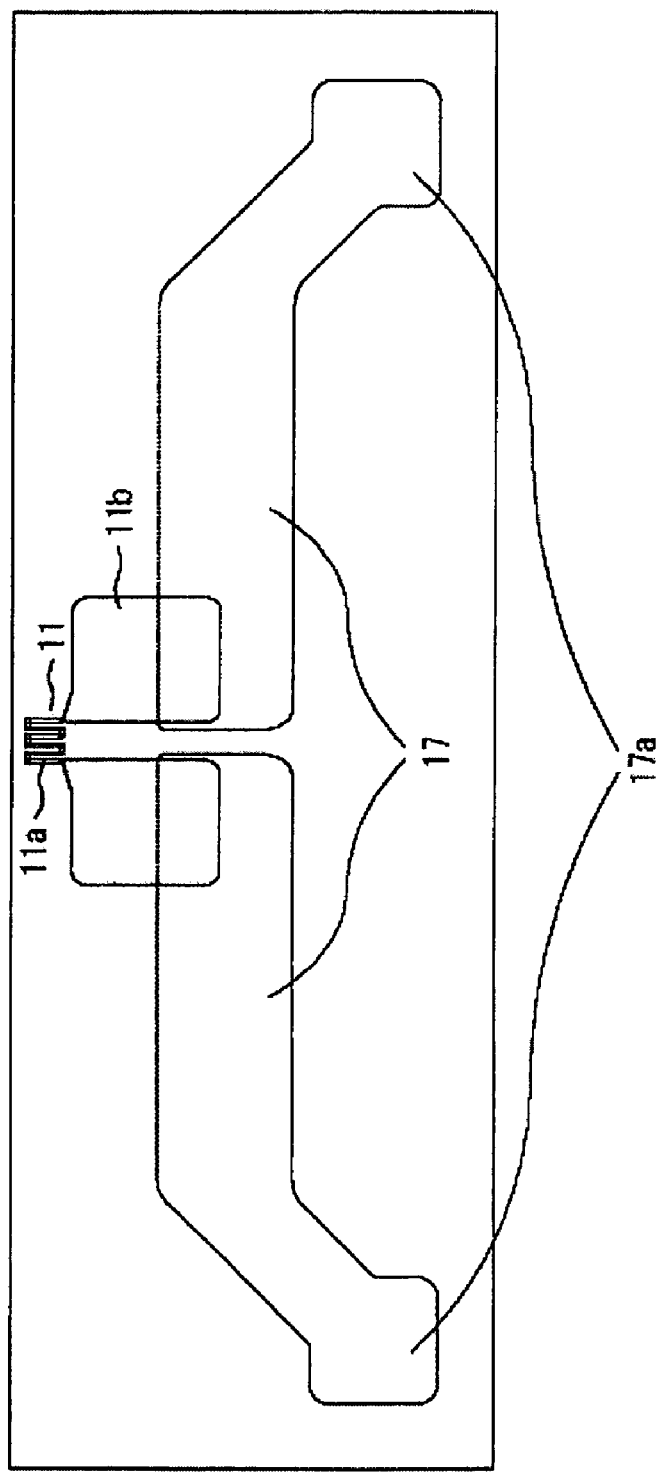
FIG. 6 is a view of a heat generating resistor as viewed from the side of the trailing edge face, taken along line Z—Z in FIG. 1.

FIG. 4 shows the trailing edge face 8 of the magnetic head slider 1 shown in FIG. 3. FIG. 1 is a cross sectional enlarged view of the thin film magnetic head portion 1b formed with the magnetic read/write device 2 taken along line X—X in FIG. 4. FIG. 5 is a cross sectional enlarged view of a heat generating resistor relay terminal 30 taken along line Y—Y in FIG. 4. FIG. 6 is a cross sectional view of the heat generating resistor 11 as viewed from the trailing edge face 8 taken along line Z—Z in FIG. 1. The constitution of the thin film magnetic head portion 1b of the magnetic head slider 1 according to one embodiment of the invention is to be described with reference to FIG. 1 and FIGS. 4 to 6. In FIG. 1, the thin film magnetic head portion 1b is formed with the magnetic read/write device 2 comprising a magnetic read element 2b and a magnetic write element 2a on the substrate portion (slider) 1a by using a thin film process. A heat generating resistor 11 is formed between the substrate portion 1a and the magnetic read element 2b for heating a portion of the thin film magnetic head portion 1b to thermally expand and protrude the same for controlling the flying height of the magnetic read/write device 2. Then, a hard protective film 31 is formed so as to cover the heat generating resistor 11 and the magnetic read/write device 2.

In order to make the response speed in the flying height control of the magnetic head slider 1 as high as possible and reduce the effect caused by the heat generation of the heat generating resistor 11 on the magnetic read element 2b, it is preferred to provide the heat generating resistor 11 between the substrate portion (slider) 1a and the magnetic read element 2b and situate the top end of the heat generating resistor 11 at a position apart backward from the magnetic read element 2b.

Referring to FIG. 4, write relay terminals 4, read relay terminals 5, and heat generating resistor relay terminals 30 are formed on the trailing edge face 8 of the magnetic head slider 1. The write relay terminals 4 allow lead wires 3a (only one of two leads is shown in FIG. 4) formed in ohmic contact with the magnetic write element 2a to electrically connect with the outside. The read relay terminals 5 allow lead wires 3b formed in ohmic contact with the electrodes of the magnetic read element 2b to electrically connect with the outside. The heat generating resistor relay terminals 30 allow lead wires 17 (refer to FIG. 6) formed in ohmic contact with the heat generating resistor 11 to connect with the outside. While a hard protective film 31 is formed over the magnetic read/write device 2, and the lead wires 3a, 3b, since the hard protective film 31 is transparent, the magnetic read/write device 2 and the lead wires 3a, 3b are observed at the trailing edge face 8 in FIG. 4.

The constitution of the magnetic read/write device 2 and the heat generating resistor 11 is to be described in accordance with the production steps. In FIG. 1, an underlying insulating film 9 comprising alumina or the like is formed on the substrate portion (slider) 1a in FIG. 1, and the heat generating resistor 11 comprising a thin film resistor made of a metal film is formed above the underlying insulating film 9. FIG. 6 shows the constitution of the heat generating resistor 11 as viewed from the side of the trailing edge face 8, in which the heat generating resistor 11 is formed by meandering a thin film resistor 11a of a metal film. Further, as shown in FIG. 6, conduction portions 11b, lead wires 17 and terminal portions 17a for the heat generating resistor 11 are formed. A metal material such as NiFe or NiCr is suitable for the material for the thin film resistor 11a of the heat generating resistor 11. Further, the material may be different between the thin film resistor 11a as the heat generating portion of the heat generating resistor 11 and the conduction portion 11b. The heat generating resistor 11 is to be described later in detail. Subsequently, as shown in FIG. 1, an insulative layer 12 is formed between and over the thin film resistors of the heat generating resistor 11.

Then, as shown in FIG. 1, a lower shield film 18 is formed over the insulative layer 12, and the upper surface of the lower shield film 18 is planarized by CMP. A lower gap film 19 comprising, for example, alumina is formed over the planarized lower shield film 18 and, further, a magnetoresistive device (hereinafter referred to as MR device) 20 as a magnetic sensor and a pair of electrodes (not illustrated) for leading magnetic signals as electric signals are formed. Subsequently, an upper gap film 22 and an upper shield film 23 made of alumina or the like are formed and the upper surface of the upper shield film 23 is planarized by CMP. An upper shield insulating film 24 made, for example, of alumina is formed on the planarized upper shield film 23. Thus, formation of the heat generating resistor 11 and the magnetic read element 2b are completed.

The heat generating resistor 11 is formed by using the thin film process. In this embodiment, a fine wire made of NiCr and having 0.1 μm in thickness and 4.5 μm in width is meandered in a region of 60 μm in depth and 60 μm in width in which gaps are filled with alumina, thus forming a heat generating body. The resistance value is about 500Ω. It is very important to ensure insulation between the heat generating resistor 11 and the lower shield film 18. Since a large current is supplied to the heat generating resistor 11, electrical leakage is caused between the resistor and the lower shield film 18 unless sufficient insulation is ensured. Electrical leakage can cause the thin film head not to perform its function in some cases. Further, in a case where the heat generating resistor 11 is excessively closer to the MR device 20, the effect of heat generation exerts on the MR device 20 to deteriorate the characteristics thereof or shorten the working life thereof. Accordingly, it is preferred to form the resistor 11 behind the MR device 20.

Figure 7:
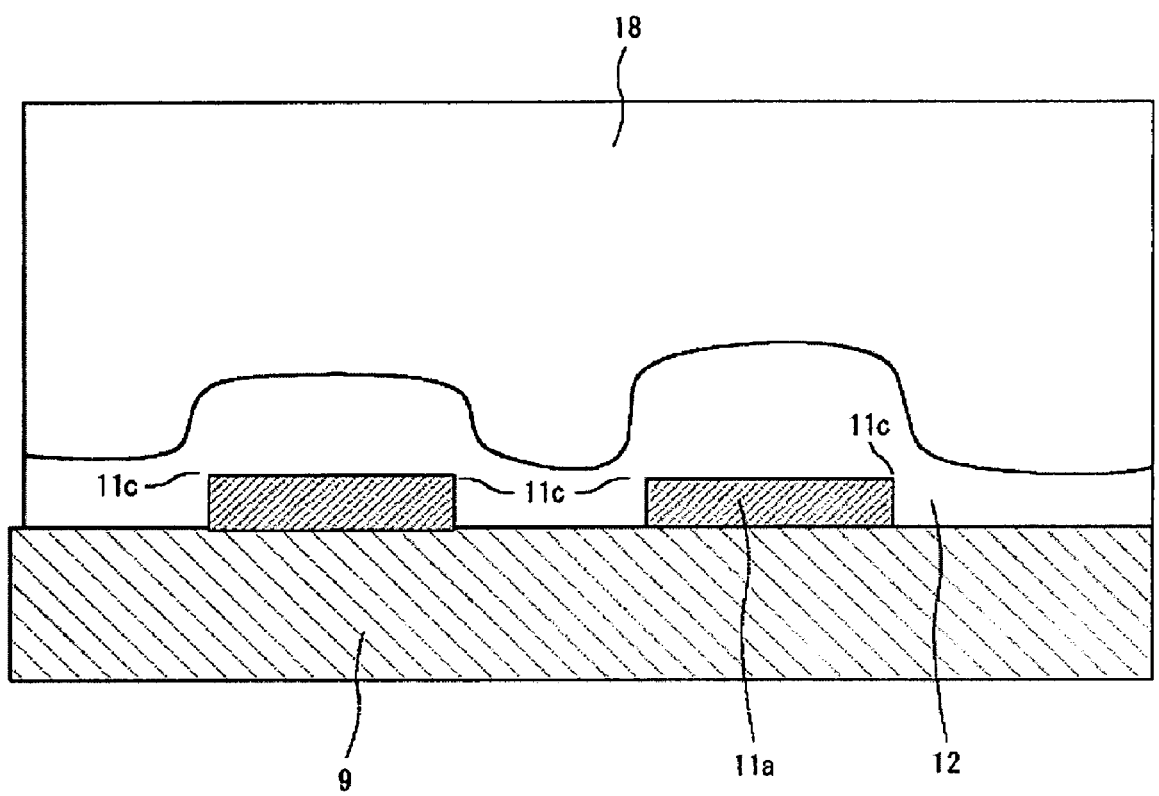
FIG. 7 is a view showing a positional relationship among the heat generating resistor, an insulating film and a lower shield film.
Figure 8:
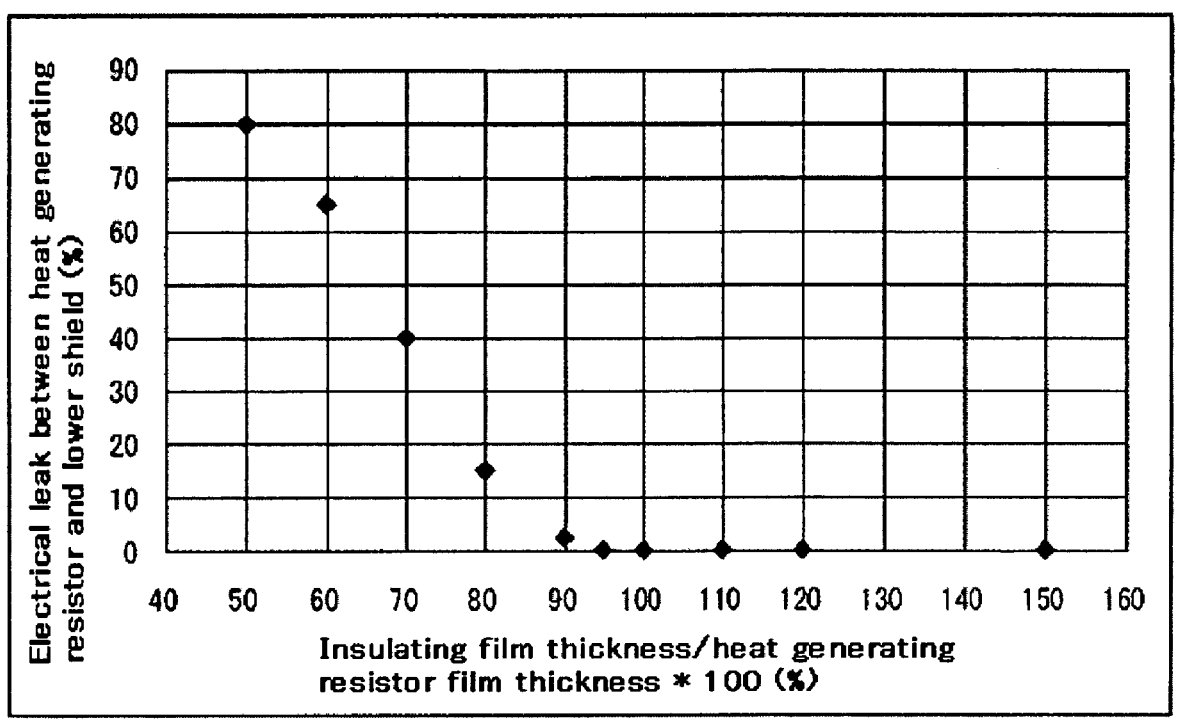
FIG. 8 is a graph showing the relationship between electrical leakage and the ratio of the thickness of the insulating film to that of the heat generating resistor.

FIG. 7 is a schematic cross-sectional view of the thin film resistor body 11a of the heat generating resistor 11, the lower shield film 18, and the insulating film 12. As shown in the figure, deposition of the insulating film 12 over the corners 11c of the thin film resistor 11a is an important factor for ensuring insulation between the thin film resistor body 11a and the metal film of the lower shield film 18. In the embodiment, a relative film thickness between the heat generating resistor 11 and the insulating film 12 is noted for further improving the deposition of the insulating film 12 over the corners 11c of the thin film resistor body 11a. FIG. 8 shows the result of investigating a relation between the factor and the electric leakage between the heat generating resistor 11 and the lower shield film 18. In view of the result shown in FIG. 8, it has been found that electrical leakage between the heat generating resistor 11 and the lower shield film 18 can be prevented by making the thickness of the insulative layer 12 used for ensuring insulation between the heat generating resistor 11 and the lower shield film 18 equal to or greater than that of the heat generating resistor 11. However, since the thickness of the insulating film 12 is substantially added to that of the underlying insulating film 9, the excessive thickness causes thermal protrusion of the magnetic recording and reproducing device 2. Preferably, the thickness of the insulating film 12 is 10 times or less that of the heat generating resistor 11.

The constitution of the magnetic write element 2a is to be described referring again to FIG. 1. A lower magnetic pole piece 25 is formed over an upper shield insulating film 24, and a magnetic gap film 26 comprised, for example, of alumina is formed further thereon. A coil 28 that supplies a current for generating a magnetic field and an organic insulating film 29 are formed over the magnetic gap 26. Successively, an upper magnetic pole piece 27 connected with the lower magnetic pole piece 25 at a back-gap portion is formed. Then, a hard protective film 31 comprised, for example, of alumina is formed so as to cover the entire film-deposited device for protective insulation of the device group described above. Successively, as shown in FIG. 4, the write relay terminals 4 for allowing the coil 27 to receive a current from the outside and the read relay terminals 5 for transmitting magnetic signals to the outside are formed and, simultaneously, heat generating resistor relation terminals 30 for allowing the heat generating resistor 11 to receive a current from the outside are formed over the hard protective film 31.

The heat generating resistor relay terminal 30 is formed on a stud 17b (refer to FIG. 5). The stud 17b is formed by plating copper on a terminal portion 17a of the lead wire 17 as shown in FIG. 5. An opening adapted to form the stud 17b is previously formed during formation of each insulating film. The write relay terminal 4 and the read relay terminal 5 are also formed on studs that have been formed at the terminal portions of the lead wires 3a, 3b, respectively.

As has been explained above, the embodiment of the invention can prevent electric leakage between the heat generating resistor and the metal film such as the lower shield film without producing thermal protrusion in the magnetic read/write device. Further, the embodiment can increase the response speed for the control of the flying height of the magnetic head slider while preventing temperature elevation of the MR device caused by the heat generation of the heat generating resistor. Furthermore, by mounting the magnetic head slider providing the effect described above on a magnetic disk drive, normal read and write are possible even upon change of the temperature inside the drive and the circumstantial temperature such as an atmospheric temperature. The effect of this embodiment can also be provided either in an in-plane recording head and a vertical recording head.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider comprising:
   a substrate portion;
   a first insulating film formed above the substrate portion;
   a heat generating device formed above the first insulating film;
   a second insulating film formed over the heat generating device; and
   a magnetic write/read device formed above the second insulating film;
   wherein a thickness of the second insulating film is equal to or greater than a thickness of the heat generating device.

2. The magnetic head slider according to claim 1, wherein the thickness of the second insulating film is equal to 10 times or less the thickness of the heat generating device.

3. The magnetic head slider according to claim 1, wherein the heat generating device comprises a heat generating resistor.

4. The magnetic head slider according to claim 3, wherein the heat generating resistor is a thin film resistor meandering on the first insulating film.

5. The magnetic head slider according to claim 1, wherein the magnetic read/write device comprises a stack of a magnetic read element and a magnetic write element, and the second insulating film is disposed between the heat generating device and the magnetic read element.

6. The magnetic head slider according to claim 1, wherein a top end of the heat generating device is formed at a position apart backward from the magnetic read element of the magnetic read/write device.

7. The magnetic head slider according to claim 6, wherein the thickness of the second insulating film is equal to 10 times or less the thickness of the heat generating device.

8. The magnetic head slider according to claim 6, wherein the second insulating film comprises alumina and has a film thickness greater than and 10 times or less the thickness of the heat generating device.

9. The magnetic head slider according to claim 8, wherein the heat generating device is a thin wire of NiFe or NiCr meandering on the first insulation film.

10. A magnetic head slider comprising:
    a slider having a leading edge face and a trailing edge face;
    a first insulating film formed on the trailing edge face of the slider;
    a heat generating resistor formed on the first insulating film;
    a second insulating film formed over the heat generating resistor; and a magnetic read/write device formed on the second insulating film;

wherein a thickness of the second insulating film is equal to or greater than the thickness of the heat generating resistor.

11. The magnetic head slider according to claim 10, wherein the thickness of the second insulating film is equal to 10 times or less the thickness of the heat generating resistor.

12. The magnetic head slider according to claim 10, wherein a top end of the heat generating resistor is formed at a position apart backward from a magnetic read element of the magnetic read/write device.

13. The magnetic head slider according to claim 12, wherein the thickness of the second insulating film is equal to 10 times or less the thickness of the heat generating resistor.

14. A magnetic disk drive comprising:
a magnetic disk;
a spindle motor configured to rotate the magnetic disk supported on a rotary shaft thereof;
a magnetic head slider for writing and reading information to and from the magnetic disk;
a suspension configured to support the magnetic head slider; and
a driving device configured to move the suspension in a radial direction of the magnetic disk;
wherein the magnetic head slider comprises:
a substrate portion;
a first insulating film formed over the substrate portion;
a heat generating resistor formed on the first insulating film;
a second insulating film formed over the heat generating resistor and having a thickness greater than a thickness of the heat generating resistor; and
a read/write device formed on the second insulating film.

15. The magnetic disk drive according to claim 14, wherein the thickness of the second insulating film is equal to 10 times or less the thickness of the heat generating resistor.

16. A magnetic disk drive comprising:
a magnetic disk;
a spindle motor configured to rotate the magnetic disk supported on a rotary shaft thereof;
a magnetic head slider for writing and reading information to and from the magnetic disk;
a suspension configured to support the magnetic head slider; and
a driving device configured to move the suspension in a radial direction of the magnetic disk;
wherein the magnetic head slider comprises:
a substrate portion;
a first insulating film formed over the substrate portion;
a heat generating device formed on the first insulating film;
a second insulating film formed over the heat generating device; and
a read/write device formed on the second insulating film;
wherein a top end of the heat generating device is formed at a position apart backward from the magnetic read element of the magnetic read/write device, and a thickness of the second insulating film is greater than a thickness of the heat generating device.

17. The magnetic disk drive according to claim 16, wherein the heat generating device comprises a heat generating resistor.

18. The magnetic disk drive according to claim 17, wherein the thickness of the second insulating film is equal to 10 times or less the thickness of the heat generating resistor.

* * * * *